(12) United States Patent
Arnerup

(10) Patent No.: US 8,333,167 B2
(45) Date of Patent: Dec. 18, 2012

(54) ANIMAL FEEDER

(75) Inventor: Lars Arnerup, Nynashamn (SE)

(73) Assignee: DeLaval Holding AB, Tumba (SE)

( * ) Notice: Subject to any disclaimer, the term of this patent is extended or adjusted under 35 U.S.C. 154(b) by 30 days.

(21) Appl. No.: 13/056,338

(22) PCT Filed: Jul. 27, 2009

(86) PCT No.: PCT/EP2009/005417
§ 371 (c)(1),
(2), (4) Date: Jan. 28, 2011

(87) PCT Pub. No.: WO2010/012432
PCT Pub. Date: Feb. 4, 2010

(65) Prior Publication Data
US 2011/0126772 A1    Jun. 2, 2011

(30) Foreign Application Priority Data
Jul. 28, 2008   (GB) .................................. 0813783.8

(51) Int. Cl.
*A01K 9/00*   (2006.01)
(52) U.S. Cl. ........................................................ 119/71
(58) Field of Classification Search .................. 119/71, 119/72, 72.5, 456–457
See application file for complete search history.

(56) References Cited

U.S. PATENT DOCUMENTS

| | | | |
|---|---|---|---|
| 721,384 A * | 2/1903 | Phillips | ............................ 119/71 |
| 2,044,312 A | 6/1936 | Laufer | |
| 3,097,627 A | 7/1963 | Garcia | |
| 3,306,257 A * | 2/1967 | Conover | ........................ 119/515 |
| 3,421,484 A | 1/1969 | Flocchini | |
| 4,173,948 A | 11/1979 | Austin | |
| 4,660,509 A | 4/1987 | Steudler, Jr. | |
| 6,016,769 A | 1/2000 | Forster | |
| 6,487,987 B1 * | 12/2002 | Choi | ............................. 119/51.5 |
| 2003/0079692 A1 | 5/2003 | Steudler, Jr. et al. | |
| 2006/0201435 A1 | 9/2006 | Arnerup et al. | |

FOREIGN PATENT DOCUMENTS

| | | |
|---|---|---|
| CA | 2208491 | 6/1998 |
| EP | 1 234 497 A2 | 8/2002 |
| GB | 2194723 | 3/1988 |
| RU | 2 072 561 C1 | 1/1997 |
| SU | 858 686 A | 8/1981 |
| SU | 1158127 | 5/1985 |

OTHER PUBLICATIONS

UK-IPO Search Report dated Nov. 28, 2008 in corresp GB0813783.8.
International Search Report, dated Oct. 29, 2009, from corresponding PCT application.
Supplementary International Search Report, dated Nov. 25, 2010, from corresponding PCT application.

\* cited by examiner

*Primary Examiner* — Monica Williams
*Assistant Examiner* — Timothy Schwarz
(74) *Attorney, Agent, or Firm* — Young & Thompson

(57) ABSTRACT

An installation with animal enclosures includes a nipple assembly with a feeding nipple for dispensing liquid feed to animals in the installation, where a single feeding nipple is pivotable between at least two animal enclosures, the nipple assembly including the feeding nipple mounted on a pivot, which pivot is biased to maintain the feeding nipple in a neutral position between the extremes of a range of pivotability.

17 Claims, 4 Drawing Sheets

ANIMAL FEEDER

BACKGROUND OF THE INVENTION

1. Field of the Invention

The present invention concerns a means for feeding animals with liquid feed. The invention may in particular be applicable to animals which are kept, raised and reared in a commercial context, such as calves, pigs, sheep, goats and other mammals.

2. Description of Related Art

Known feeding devices for feeding animals such as pigs, lambs or calves generally comprise an artificial teat often known as a nipple, which is connected to a liquid feed supply. Feed may be selectively delivered to the nipple during activation of a feeding sensor in the form of a trigger type sensor provided at the nipple and configured to detect the presence of an animal feeding or seeking to feed. Optionally, identification means at or nearby a nipple may be provided in conjunction with an information system and controlled valve means to permit the selective supply of feed to certain animals. Feed quantity measuring devices may be used in conjunction with feed supply means for determining a quantity to be supplied and for allowing the quantity consumed by a given animal to be measured and stored.

Animal feed supply means which comprise a flexible nipple for supplying liquid feed from a feed supply container are known from e.g. U.S. Patent Application 2006/0201435, U.S. Pat. No. 6,016,769 and European Patent Application 1234497. In these systems, any given feeding device is provided with a suckling nipple which may be accessed by any one animal from a group of animals at any given time. U.S. Pat. No. 2,044,312 discloses a feeding device for calves comprising a liquid feed nipple which is manually pivotable between two adjacent enclosures.

The capital cost of installations for raising young animals is affected by the quantity and complexity of feed supply equipment needed for a given installation size. Moreover, the performance of these installations tends to be enhanced by greater sophistication and functionality of the installed equipment. A reduction of the level of equipment cost per animal can be achieved by reducing complexity and/or quantity of equipment, although this sometimes entails a corresponding reduction in functionality. In some cases, a greater level of sophistication allows a larger number of animals to utilise a given feeding point. Nevertheless, in many installations, it is the continued practice to keep animals in individual enclosures (single enclosures) or in multiple enclosures, each multiple enclosure holding a small number of animals. In such cases, it is normal practice to provide a feeding point at each enclosure. The utilisation level of each feeding point will thereby be lower in association with single animal enclosures than for feeding points which are accessible by a large number of animals. It is difficult to justify a high level of sophistication and functionality of feeding points which are provided in large numbers relative to the number of animals in a given installation and which may therefore each be utilised to a lower degree, thereby potentially limiting the efficiency of a feeding installation.

BRIEF SUMMARY OF THE INVENTION

The present invention provides an improved feeding point for dispensing liquid feed and an installation comprising the improved liquid feed dispenser of the invention.

To this end, there is provided an installation including a feeding nipple as defined in appended claim 1. Further preferred features of the installation are defined in subclaims 2-12. A method according to the invention is defined in claim 13.

The installation of the present invention makes it possible to enable a feeding nipple, which can be described as a feed dispensing nozzle, to be used from more than one side of the nipple. An animal is not required to be positioned in the axis of the feeding nipple in order to use it. Most significantly, the nipple assembly including a pivotable nipple allows one dispenser to be positioned such that it can supply liquid feed to animals which are housed in more than one separate enclosure. In general, the enclosures served by a single dispenser and single nipple will be neighbouring or adjacent enclosures. At least two, three, four or five neighbouring enclosures may thus be served by a single dispenser, the single nipple assembly of which comprises a pivot. In this way, the advantages of greater sophistication and functionality of feed dispensers can be combined with the possibility of keeping animals individually or in small groups, because the utilisation rate of the dispenser with a pivoting function can be increased in relation to dispensers provided for only a single animal or a small group of animals.

The liquid feed dispenser of the invention may be supplied with liquid feed from a reservoir or from a ring line or both. The dispenser may in particular be one of many dispensers arranged connected to a common supply network. Alternatively, the dispenser may be provided with an individual feed supply. Any feed supply may comprise hoppers or tanks for storage of separate feed ingredients, a supply device for metering and supplying respective ingredients in particular amounts, a mixer device and a reservoir for storing quantities of prepared feed.

Liquid feed to be supplied by the dispenser of the present invention may in particular include a mixture of dry and liquid ingredients which are mixed in proportions which allow the mixture to flow through supply pipes and through an aperture in the form of a hole or slit type opening at a distal end of a feeding nipple. A feeding nipple which is suitable for use in the present invention is capable of being drawn into the mouth of an animal and will dispense liquid feed supplied to the nipple and contained therein when the nipple element is suckled upon by the animal. For the purposes of the present disclosure, such an oral feed dispensing nozzle, or, more particularly, intra-oral feed dispensing nozzle is referred to as a feeding nipple or nipple. Such nipples are also known in the art variously as nozzles or teats, or by other terms. One characteristic of intra-oral feed dispensing nozzles or nipples or teats is that they are relatively soft and pliable. In effect, they mimic the teat or nipple of a female of the species of animal which is feeding or drinking. The feeding nipple according to the present invention preferably has a degree of pliability which allows for it to be comfortably accommodated within the mouth of an animal during feeding.

The pivotability of the nipple assembly of the present invention is additional to any pliability or flexibility of the body of the nipple element itself. In particular, the nipple may be mounted on a pivot which forms part of the nipple assembly, wherein the pivot is pivotable such that it allows a single nipple element to adopt more than one orientation in relation to the installation and thereby to dispense liquid to animals which are kept in separate enclosures. Most particularly, the nipple may be pivotable between animal enclosures such that it is capable of adopting an alignment extending in towards each said enclosure. In particular, the extent of pivotability should be enough to allow an animal in each enclosure to feed from the pivotable nipple. In some embodiments, the nipple may adopt a neutral position in alignment between adjacent or neighbouring enclosures such that it may be grasped by an animal in either enclosure and drawn into an orientation for feeding the animal having grasped the nipple from a given enclosure. The term "pivotable" as used to describe the nipple of the present invention may encompass a variety of means for enabling a pivotable movement of a feeding nipple.

Thus, a pivot may for example encompass a hinge having one or more pivot pins joining hinging parts or it may comprise one or more resiliently or elastically bendable members with or without additional supporting members or elements. The pivot may thereby be a hinge member or a resiliently bendable member such as an elastic member. The nozzle assembly may comprise additional elements discussed below and illustrated by way of examples. The pivotable nipple assembly may allow the nipple to travel through an arc in a single plane or in multiple planes. In particular, the nipple may universally pivotable, i.e. it may be free to pivot in an unlimited number of planes about its point of attachment to a support or feed supply means, which may be a feed supply port.

As discussed, the extent of the pivotable motion of the feeding nipple may preferably be such as to allow the nipple to be accessed from different angles in relation to the installation or feed dispenser housing. In particular, the extent of the pivotability of the feeding nipple should allow the feeding nipple to be accessed and used for feeding by animals which approach the dispenser from either side of a common partition wall or barrier, which may be a part of one or more animal enclosures for single or for multiple animals. To this end, the pivotability may be either axial, i.e. measured in a plane which includes the axis of the feeding nozzle when it is in its rest position, or radial, i.e. measured in a plane which is substantially radial to the axis of the nozzle in its rest position. In some cases, the pivotability may be both axial and radial. A suitable length of arc through which the feeding nozzle may be pivotable is at least about 35 degrees in any single plane, from one pivoting extremity to another. Preferably, the extent of pivotability may describe an arc of at least 40 degrees. Still preferably, the extent of pivotability may describe an arc of at least 45 or at least 50 degrees or at least 55 degrees or at least 60 degrees or at least 65 degrees. In some embodiments, it may be desirable for pivotability of at least 70 degrees or at least 75 degrees or at least 80 degrees or at least 85 degrees to be provided. A greater extent of pivotability may be required depending on the nature of a given installation, in particular with regard to its accessibility from multiple enclosures or pens. Thus, an axial pivotability of greater than 90 degrees may be provided, possibly in conjunction with a universal pivotability in a radial plane.

The nipple assembly of the invention may include a feeding nipple and a pivot, as well as an attachment means for attachment of the nipple assembly to a structural element which may be a generally fixed element such as a fixed barrier or enclosure member or a part of a feed dispenser such as a dispenser housing, provided in association with more than one enclosure. The nipple assembly may thereby comprise a pivot mounted on a support which enables the feeding nipple to pivot in relation to a point of attachment to the feed dispenser or other fixed element of an installation.

The term installation designates a structure in which at least one animal is kept. In general, the term designates a construction comprising multiple animal enclosures wherein some enclosures are grouped in a neighbouring or adjacent relationship to one another. An installation according to the invention will thereby comprise at least one feed dispenser provided in association with two or more separate animal enclosures. As discussed, respective enclosures may be enclosures for single animals or for more than one animal. In one aspect of the invention, it is envisaged to provide rows of enclosures in a side by side relationship, with one feed dispenser according to the invention being provided in association with pairs of enclosures. Aisles for movement of animals and personnel and equipment may separate respective rows of enclosures.

An animal enclosure may typically comprise walls or barriers within the perimeters of which one or more animals may be kept. In many instances a barrier or wall along at least one side of an enclosure will be common to an adjacent animal enclosure, thereby separating the enclosures from one another. An enclosure of this type is sometimes called a pen.

According to some embodiments, a pivot may comprise a hinge or a longitudinal bendable core made from an elastically deformable material and provided with one or more spring biasing means which tend to bias the core to a neutral position which may be aligned with the axis of the feeding nipple. In many instances the neutral axis of the feeding nipple may be aligned with a partition wall or barrier separating adjacent animal enclosures. Such a position may be known as a neutral position of the pivot or a neutral position of the nipple. The one or more biasing means may suitably be provided at the periphery of the core. In one embodiment, the pivot, which may be a longitudinal bendable core or hinge may be at least partially enclosed by a helical spring which tends to bias the core into a neutral non-deflected position, determined by the shape of the spring. In other embodiments, one or more leaf springs may be arranged at the periphery of the longitudinal core, with each spring tending to bias the core back towards its neutral position when it is deflected away from its neutral axis. Alternatively, one or more spring means may be provided incorporated within the pivot. For example, where a pivot comprises a hinge or a bendable core, such as a bendable tubular member, a spring may be included within the walls of the core or tube or within the hinge elements.

In some embodiments, there may be a drive means associated with the nipple assembly, capable of pivoting the nipple between its various possible positions. Any suitable drive means may be employed for this purpose, examples of which include an electric motor or a pneumatic drive. Drive means may be associated with the nipple assembly or specifically with the pivot by means of appropriate linkages known per se and if necessary, by means of gears. In certain embodiments, the pivot may be comprised of a drive mechanism capable of rotating or swivelling the nipple between various pivot positions. Such a drive system may be capable of pivoting the nipple between enclosures thereby allowing access to liquid feed from respective enclosures at different times. The times during which access to feed may be allowed at respective enclosures may in particular be predetermined within a control system. This may in particular be in accordance with times at which it is determined that an animal or animals in one enclosure require to be fed, while an animal or animals in another enclosure have recently received feed.

In a still further embodiment of the invention, the nipple assembly may be provided retractable to a position from which it may not be reached by an animal in either of the enclosures. In particular, the feeding nipple may be retractable inside a dispenser housing. There may be provided a cleaning system for cleaning the feeding nipple when it is in its retracted position. In some embodiments, the feeding nipple may be moved to a retracted position when none of the animals in the respective enclosures with which it is associated are considered to be entitled to receive feed at a given time. To this end, a nipple assembly may be mounted on a retractable support means capable of retracting the nipple assembly from its deployed position to a retracted position out of reach of animals in respective enclosures. Alternatively, other retractable mechanisms may be provided for the designated purpose. As an alternative, there may be provided one or more guard members which may be moved between the nipple assembly and one or more enclosures with which the nipple is associated, for denying access to the nipple by animals in one or more enclosures. Such a guard a member or members may be associated with a feed dispenser or with any suitable element of the installation.

In a further aspect of the invention, there may be provided a detector arrangement positioned about the nipple assembly, which is capable of sensing a deflection of the feeding nipple in a given direction, especially, in a given direction relative to a neutral position of the nipple. For the present purposes, a deflection of the nipple is a movement of the dispensing nipple away from a neutral position or axis of the feeding nipple when it is at a rest position or in an undisturbed state. A deflection may occur when a nipple is drawn in a certain direction, for example by an animal wishing to make use of the feeding nipple from one side or another, or when the nipple is driven by a drive means into a position such as a dispensing position, away from its neutral position. The detector arrangement may comprise any suitable means such as proximity sensors, strain gauges, remote optical means such as infrared or camera imaging means, or magnetic sensor means or switch means and the like, able to distinguish in which one of multiple possible directions the nipple is deflected at any given moment. In one embodiment, a drive mechanism associated with a pivoting nipple may provide positional feedback concerning the position of the nipple to a control system. Alternatively, a detector arrangement may comprise two or more detectors each of which is arranged to issue a signal when a deflection of the nipple assembly in a given direction occurs. Thus, in a nipple assembly intended to supply feed in two separate directions, there may be positioned a detector at two sides of the nipple assembly. In one arrangement, the detectors may be provided on opposite sides of the assembly. Any appropriate detector arrangement would allow the dispenser assembly to be positioned straddling two adjacent enclosures and thereby supplying feed to animals in both enclosures. Preferably, two appropriately placed detectors would enable a dispenser to straddle two enclosures. According to further features of the invention, there may be provided a dispenser means straddling three or four or five or more enclosures. The number of enclosures served by a single dispenser may be constrained by the narrow space available for accessing the dispenser nipple and by the need for a control system to differentiate between neighbouring directions in which the nipple is deflected during use by animals in neighbouring enclosures. A detector arrangement included with the present invention should thereby be positioned about the nipple assembly such that one or more individual detectors are comprised in the nipple assembly itself, or such that one or more detectors are placed in proximity to the nipple assembly, sufficiently close to the assembly to detect the intended directional deflection of the feeding nipple. In the present context, a detector arrangement may be positioned about the feeding nipple in such a manner that a movement of the nipple into or out of a dispensing position at an enclosure may be detected. The detector may thereby form part of a feed dispenser associated with a feeding nipple or it may form part of the installation per se. The purpose of the detector arrangement or of each detector is to emit a signal to a control system indicating the position of a nipple at a given time. The control system may advantageously contain information as to those positions of the nipple which correspond with a given enclosure or, in some cases, with a given animal. It may thus be indicated which enclosure is being supplied at any time by a given feeding nipple.

In certain embodiments, one or more of the springs may be arranged with a corresponding detector, capable of issuing a signal when the spring with which a given detector is associated is deformed in such a way that a directional deflection of the feeding nipple can be deduced and indicated. A suitable bendable core may comprise an internal passage allowing fluid and liquid fed to pass from a supply pipe through to a feeding nipple. A detector may in some cases comprise a strain gauge. A detector arrangement may comprise one or more strain gauges.

A control system associated with the feed dispenser device of the invention may suitably comprise computer means including a processor and data storage devices. Thus, certain data may be pre-set in the system, such as, for example, which animal is present in each enclosure and which deflection sensor or deflection direction is associated with each enclosure. Thus, when a deflection in a certain direction is detected by the computer, then an automatic determination may be made as to which animal is seeking to receive feed from the dispenser in question. In accordance with efficient animal rearing practice, a determination can appropriately be made as to an animal's entitlement to receive feed at a given time and as to the appropriate feed composition for the specific animal, in cases where the system allows individual preparation of animals' feed. Where there is more than one animal in each enclosure, then each animal may wear a transponder which may allow identification of the particular animal seeking to receive feed at a given time. There may therefore be provided a single transponder identification sensor at a dispenser according to the invention, which dispenser is provided in connection with more than one enclosure. Alternatively, each enclosure may comprise an identification sensor means in the vicinity of the dispenser.

In order for the dispenser to begin dispensing feed to an identified animal, one or more sensor elements, capable of detecting when a feeding nipple is grasped in the mouth of an animal, may be disposed about the nipple assembly as part of the dispenser device. Any sensor element may suitably be comprised within a nipple assembly, for example at the periphery of the feeding nipple or of its support element, or positioned nearby the feeding nipple such that it will be activated when an animal grasps the nipple in its mouth. In one embodiment, a sensor may be provided in the form of a ring element surrounding a rearward portion of the feeding nipple at a position in which the ring sensor will be contacted by an animal's snout, when the nipple is grasped in the animal's mouth to a sufficient extent for feeding. Upon contact with an animal's snout, the ring sensor may trigger a signal in the dispenser control system to begin dispensing feed to an identified animal. This may entail preparing an individual feed ration according to a predetermined quantity and composition for the identified animal. It may also entail denying feed in a case where the identified animal is considered not to be entitled. In an alternative embodiment, actuation of the ring sensor may trigger a lookup routine in the control system according to which a deflection direction signal of the feeding nipple is used in order establish which animal is presenting itself and a determination may be made as to whether the animal receives feed.

In a further aspect of the invention, there may be included one or more indicators capable of indicating one or more states of a nipple in relation to availability of feed. In particular, an indicator may emit a visible signal such as a light signal or it may emit a sound signal, capable of being perceived by an animal in an enclosure and/or by supervisory personnel. In one embodiment, there may be one or more indicators associated with each animal enclosure, capable of indicating when feed and/or water is available in that enclosure from the feeding nipple. In other embodiments, there may be indicated when feed or water is soon to be made available in a particular enclosure. Where an indicator is used in combination with a drive system for pivoting the nipple to its respective positions, there may be a signal emitted for indicating that feed is available, a short time before the nipple is pivoted into a dispensing position at the respective enclosure. The time period in this case may be of the order of a few seconds up to one or two minutes before the feed is made available. In this way, an animal which perceives the indicator signal will anticipate that feed is to become available. Its gastric system will thus be prepared for receiving and digesting feed. In the same way, another indicator may indicate that water is to be made available, thereby informing the animal that it may receive water and, where a corresponding signal is given in advance of water being available, the animal may thereby be prepared for receiving water. Indicators may be provided in the same way in association with a pivotable feeding nipple which is not associated with a drive system. Animals may thereby be motivated to seek to feed or drink from a nipple at times when a corresponding signal from one or more indicators is given, to the effect that feed or water is available. By these means, animals may learn to associate a particular signal with a corresponding state of a nipple and to adjust their behaviour accordingly.

In a method of feeding animals according to the invention, a feeding nipple is pivotable between two enclosures in which animals may be kept. There may in particular be provided one feed dispenser in fixed relation to two or more animal enclosures, wherein each feed dispenser comprises at least one feeding nipple. In this context, a dispenser may be in a fixed position relative to an installation by virtue of being positioned permanently or temporarily in a given position in relation to respective enclosures. The method according to the invention includes supplying feed selectively to said two or more enclosures by means of said pivotable nipple. In one aspect of the invention, feed may be supplied alternately to each enclosure from among at least two enclosures nearby a feeding nipple. Additional aspects of a method of feeding animals in an installation of the present invention will become apparent from the present specification.

Further advantages and features of the present invention will become apparent from examples which are given by way of illustration. The examples show certain ways of carrying out the invention and are not an exhaustive or limiting description thereof.

BRIEF DESCRIPTION OF THE DRAWING FIGURES

DETAILED DESCRIPTION OF THE INVENTION

Figure 1:
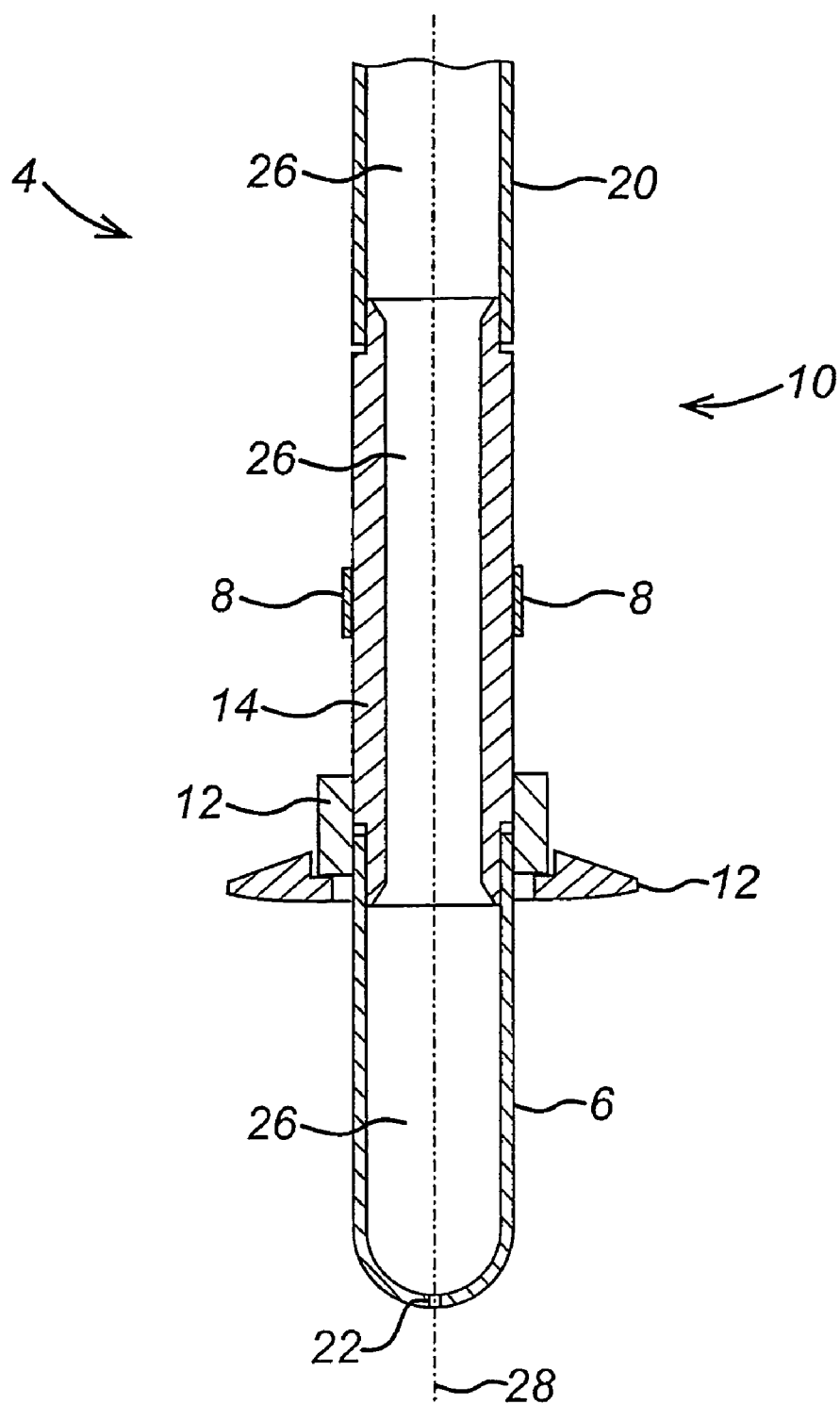
FIG. 1 shows a section view through a nipple assembly according to aspects of the invention.

In FIG. 1, a pivotable liquid feed dispenser 4 is partially shown with certain features of a nipple assembly 10 being visible. The assembly 10 as shown includes a longitudinally extending pliable nipple 6 having a restricted feed outlet opening 22 at its closed distal end, and is attached at its open proximal end to the distal end of a pivot 14, which also forms part of the nipple assembly 10. The pivot 14 may be attached at its proximal end to a feed supply shown by way of example as an outlet port of a fixed supply pipe 20. A hollow space 26 provided through the supply pipe 20 and the assembly 10 to the nipple 6 forms a conduit for the passage of liquids and liquid feed. In certain embodiments, water may be supplied through the feeding nipple 6 as an alternative to liquid feed and at alternate times, although this aspect is not discussed in detail. A feeding sensor is shown, which may be provided in connection with the nipple assembly 10. In FIG. 1, the feeding sensor is shown as a ring sensor 12 mounted upon the nipple assembly 10. In some embodiments, the sensor may be a composite sensor and it may also be provided about the nipple assembly 10 without being mounted to the assembly 10. The ring sensor 12 which is illustrated and which forms the feeding sensor is actuated by an animal which grasps the feeding nipple 6 fully in its mouth for feeding. A deflection of the ring member of the sensor 12 towards or against a base member can be detected by known means such as for example pressure sensor or electrical contact or switch means which need no further discussion. Upon detection of an animal's snout at the nipple 6, by deflection of the ring sensor 12, the feed supply system may be activated to actively supply feed to an animal or to passively allow feed to pass through the supply tubes from a mixer (not shown) or reservoir (not shown) to the nipple. In some embodiments, the liquid may be supplied to an animal from a feed supply to the nipple 6 by virtue of the effect of suction of an animal at the nipple 6, and without the need for additional pumps or valves and therefore, no feeding sensor may be required. A deflection detector arrangement 8 is shown, which may be provided for enabling the dispenser to automatically sense the orientation in which the nipple 6 is drawn by e.g. an animal pulling the nipple 6 towards it when attempting to use the nipple 6 for feeding. Such a detector may be provided in the form of a strain gauge as indicated in FIG. 1 although many alternative switches, contacts and sensors may be contemplated for fulfilling the purpose or detecting the deflection direction. In particular, multiple sensors may usefully be provided for sensing deflections in a multiplicity of directions, each direction corresponding to a sector from which an animal may approach the nipple assembly. A detector arrangement may be provided at the nipple assembly itself or it may be provided sufficiently nearby the assembly to detect a particular deflection. In embodiments which include a drive system associated with the pivot 14, the detection arrangement 8 may be incorporated as part of the drive system.

The nipple 6 in FIG. 1 is shown in the form of a longitudinal hollow tubular member with a uniform wall thickness, substantially closed at its distal end and open at its proximal end to allow attachment to a pivot 18. The nipple 6 may take a variety of forms and need not necessarily exhibit a uniform wall thickness. In particular, the nipple may have a shape which is anatomically adapted to the mouth of the animal which may use the liquid feed dispenser in question, and it may in particular have a significantly greater wall thickness than the illustrated nipple 6 in FIG. 1., such that it may be tougher and more durable. The stiffness of the nipple 6 may be such that it has a greater resistance to bending than the pivot 14. In particular, the nipple 6 may have a sufficient degree of pliability such as to be comfortable for an animal to use, while being stiff enough to cause the pivot 14 to bend in preference to any significant deformation of the nipple itself when the nipple 6 is grasped and drawn away from the nipple axis 28, which is the case of FIG. 1 may be the neutral axis of the nipple and also of the assembly 10 as a whole when the assembly 10 and nipple 6 are at rest. The pivot 14 may be provided from a generally tubular length of a flexible and/or elastic material which readily allows the nipple 6 to be drawn in a direction such that it is longitudinally oriented at an angle to its neutral or rest position axis 28, while also ensuring that upon release of the nipple 6 from a given deflected orientation, the neutral position is regained. To this end, the pivot 14 may suitably be elastic and/or resilient. The pivot 14 of FIG. 1 may be combined with any suitable spring means such as a leaf spring or helical spring, serving as a bias element (16) for biasing the nipple towards its neutral axis 28.

Figure 2:
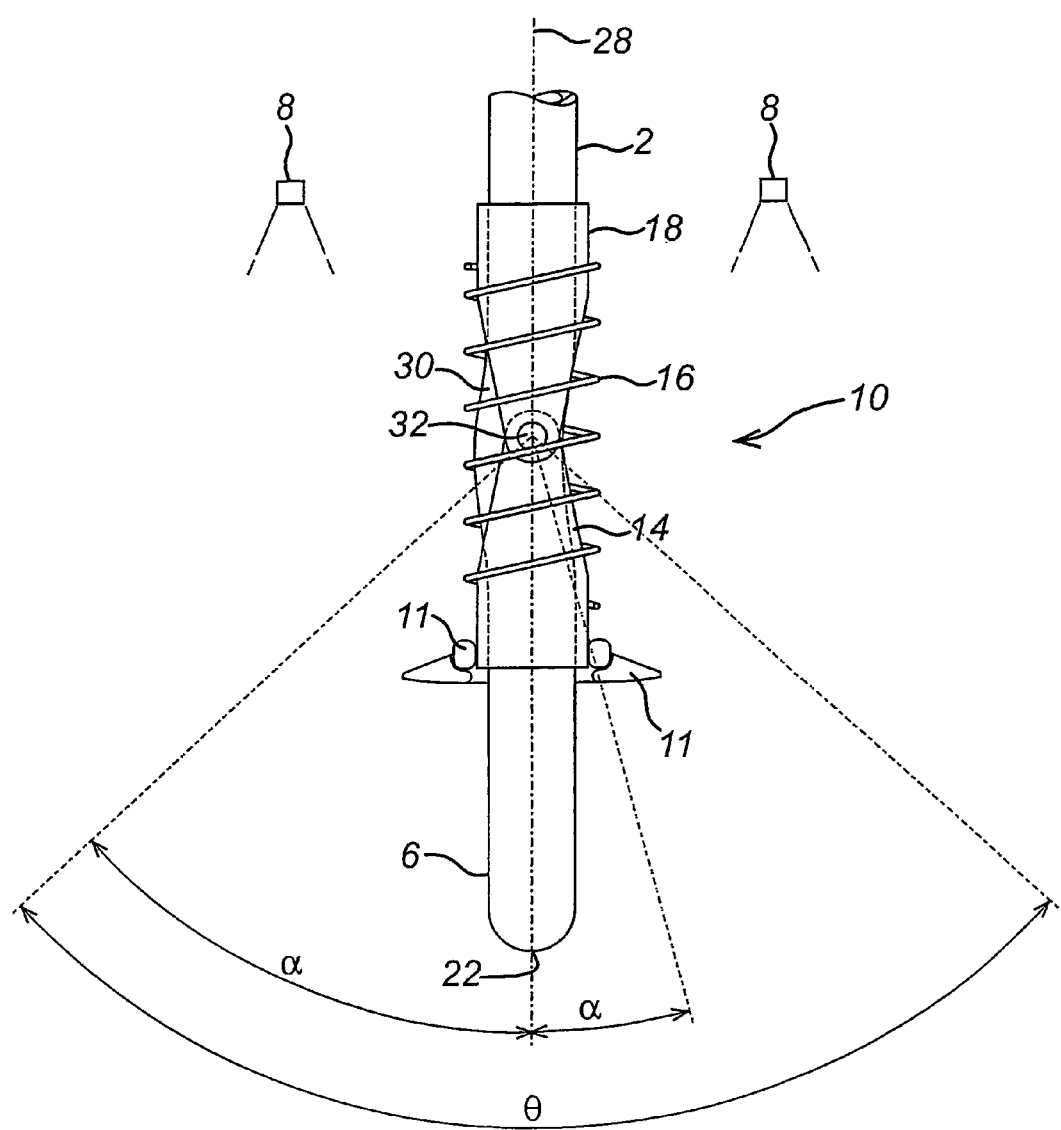
FIG. 2 shows a plan view of a schematic layout of a nipple assembly according to aspects of the invention.

In FIG. 2, some alternative construction means are illustrated for the liquid feed dispenser 4 of the invention. Accordingly, a flexible hose 30 may be provided for supplying feed from a feed supply (not shown) through a fixed member which may be a port 21 to a nipple 6, which nipple is supported in a pivot 14 in the form of an articulated hinge, comprising hinged members and a pivot pin 32. There may additionally be provided a swivel element (not shown) connecting the pivot 14 and the fixed support member 21, in order to provide more degrees of freedom for the pivoting action of the nipple 6 in relation to the assembly 10. According to the invention, when the nipple assembly 10 is suspended with its axis 28 substantially vertically aligned or only slightly inclined to the vertical, then the nipple 6 may return by gravity from a deflected position to a neutral or central position when released. In certain embodiments additional or alternative means may be provided for urging the pivotable nipple into its neutral position, such as spring devices which may be mounted on or in the assembly 10 itself. In FIG. 2, there is shown a helical spring placed around the pivot 14, the effect of which is to lightly bias the pivot into its neutral or undeflected position so that the nipple 6 regains the neutral position when it is released.

In FIG. 2 a feeding sensor 11 is shown in the form of separate elements disposed about the nipple assembly. These function in the same way as the ring sensor 12 shown in FIG. 1 for detecting the presence of the snout of an animal at the nipple 6 and, in some embodiments, for serving as a trigger for a computer or control system (not shown) to look up the feed entitlement of an animal which is at the nipple, and to activate or block the feed supply system as appropriate. In FIG. 2, there is illustrated the total angle or arc θ, through which the nipple assembly 10 may be pivoted, as well as a deflection angle α of the nipple away from its neutral axis 28. In general, the arc θ will extend symmetrically about the neutral axis 28 of the nipple. Whilst the arc θ may be a maximum extent to which the nipple may be pivoted, there may be drinking or feeding positions of an animal which lie at an deflection angle α which lies inside the arc θ. Detector arrangement 8 is shown by way of radiation receivers and/or emitters, which are capable of detecting a deflection of the assembly 10 in a given direction and which may be mounted in any suitable position for this task.

Figure 3:
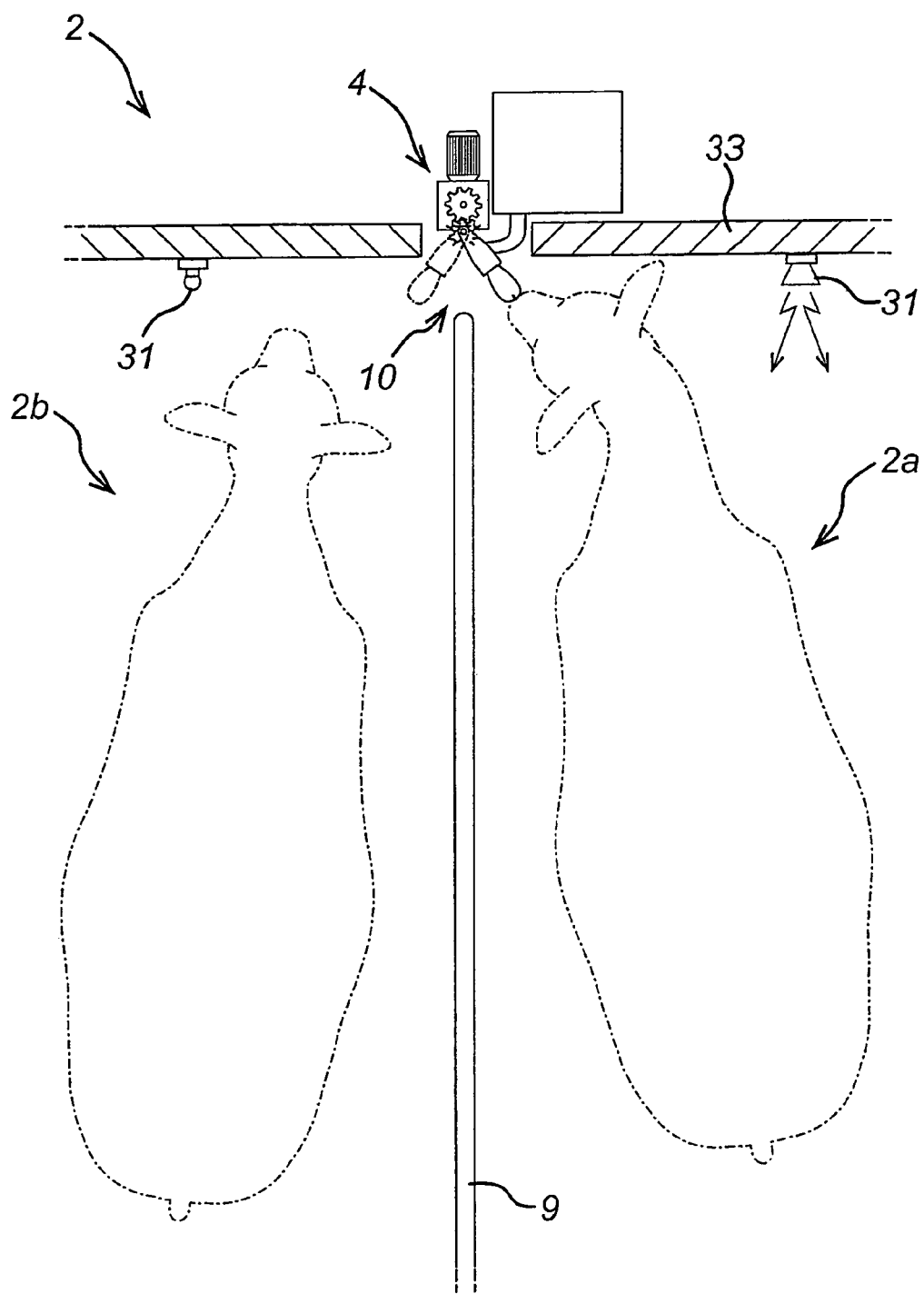
FIG. 3 shows a part plan view of a liquid feed dispenser according to aspects of the invention, in fixed relation to two neighbouring enclosures.

In FIG. 3, there is shown by way of example, a liquid feed dispenser 4, with a nipple assembly 10 in a fixed relationship to a wall member 33 and a barrier 9, all of which form part of an animal enclosure installation 2 having a liquid feed dispenser 4. In FIG. 3, there are shown two enclosures 2a and 2b, in each of which a single animal is kept. Each animal has equal access to the feed dispenser 4, which when it is grasped and drawn into the mouth of one or other animal, is deflected in a corresponding direction. Once the deflection in a given direction, corresponding to one of the enclosures, is sensed by a detector arrangement 8 (not shown in FIG. 3) a control system may evaluate whether the animal which is in the corresponding enclosure is entitled to receive feed at the relevant point in time. If feed is to be allowed, then a detection of the snout of the animal at a feeding sensor near the nipple may suitably lead to a valve or pump activation. In cases where multiple animals may be kept in a single enclosure, there may suitably be provided one or more identification sensors (not shown) at the feed dispenser 4 which, in cooperation with a transponder device worn by each animal, can detect the identity of an animal currently using or attempting to use the feed dispenser. In cases where one or more identity sensors are provided at the feed dispenser, there may be no need to provide a detector arrangement 8 for detecting the deflection direction, because the identity of each animal is confirmed independently, i.e. without requiring the device to be capable of sensing from which direction (i.e. from which enclosure) the feed is being taken. In the arrangement shown in FIG. 3, it can be seen that the nipple assembly 10 is at least partly oriented in a horizontal plane. It should be noted that the assembly may appropriately be arranged in a horizontal, vertical or in any inclined orientation, depending on the geometry of the surrounding members and support means. Also illustrated in FIG. 3 is an indicator 31 in each enclosure 2a, 2b for signalling when feed is available in an enclosure or when it is soon to be available. The indicator signal may for example be a visible signal such as a light signal, or it may for example be an audio signal such as a horn or a series of pips. In a situation where one animal from a pair of enclosures is entitled to receive feed when another animal is not, then the animal entitled to feed will, in its enclosure, perceive a corresponding signal to that effect. The nipple 6 may at the same time be pivoted by a drive system (not shown) out of reach of an animal from an adjacent enclosure, which animal is not entitled to feed at that time. Alternatively, feed may be supplied to an entitled animal while being denied to a non-entitled animal by means of a detector arrangement as described, in combination with a control system.

Also shown by way of example in FIG. 3 is a drive system capable of moving a nipple between feeding positions in more than one animal enclosure. The drive system illustrated comprised an electric motor and a gear linkage. The motor may be a servo motor or any suitable power transmission device. Hydraulic or pneumatic or electromagnetic solenoid type drives are also contemplated in the present invention. Any appropriate linkage may be contemplated as an alternative to the linkage which is illustrated.

In some embodiments there may be provided an automatic cleaning device capable of automatically cleaning a nipple after an animal has consumed feed from the nipple. Such a cleaning device may for example be a liquid spraying device capable of spraying disinfectant onto the nipple. In some embodiments a mechanical cleaning member such as a cleaning brush or sponge or fibrous wipe or cloth, which may be an impregnated nonwoven wipe or cloth may be used to clean the nipple. In some embodiments, the nipple may be retracted into a dispenser housing after an animal has consumed feed for cleaning and/or disinfecting the nipple before another animal is able to obtain feed from the nipple. Detector means for detecting the angle of the nipple and the presence of an animal, as previously described, may be used for the purpose of triggering the automatic cleaning means. Thus, when an animal has finished feeding from a nipple, a detector signal is sent to the control device which then emits the necessary signals to clean the nipple. Cleaning may take place immediately after a feeding or at any suitable time before another animal feeds from the same nipple. There may be provided a minimum time interval after which the nipple is automatically cleaned by virtue of the control system.

Figure 4:
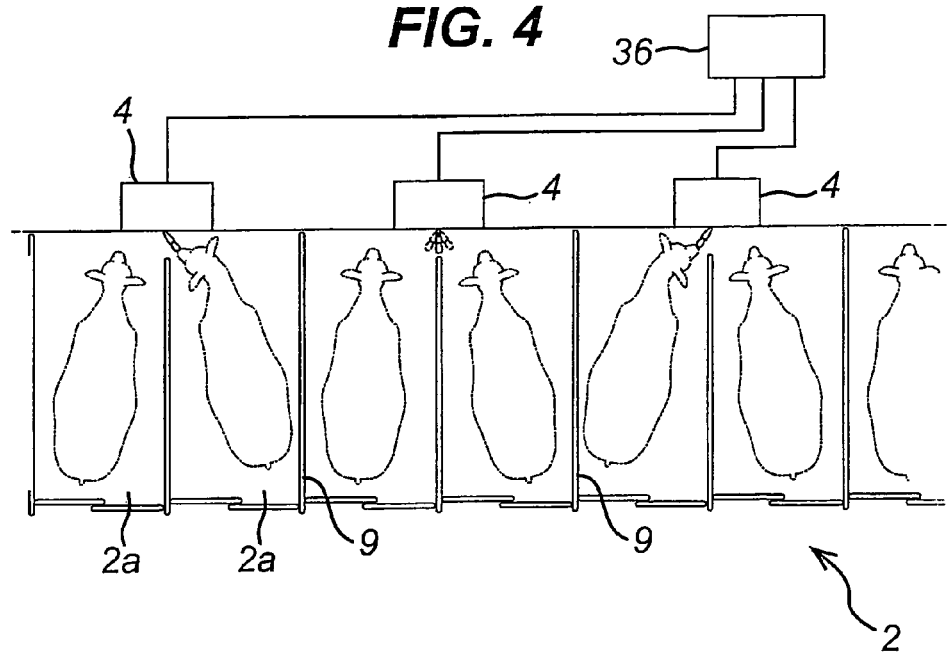
FIGS. 4-6 show schematic plan views of a liquid feed dispenser according to aspects of the invention, in fixed relation to between three and five neighbouring enclosures.
Figure 5:
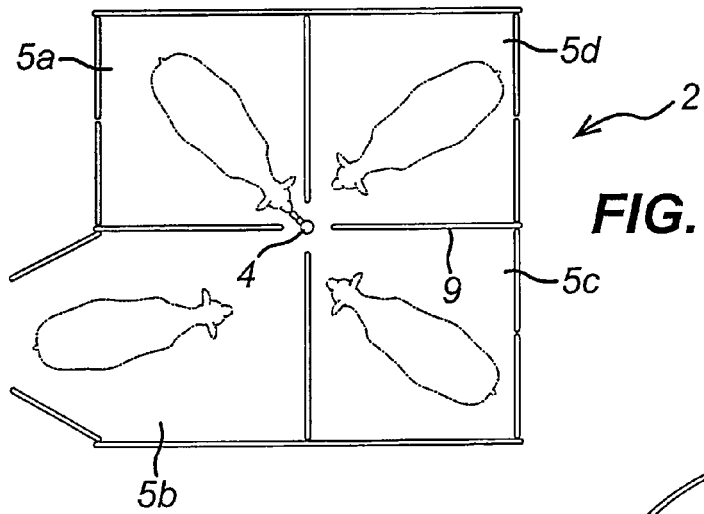
Figure 6:
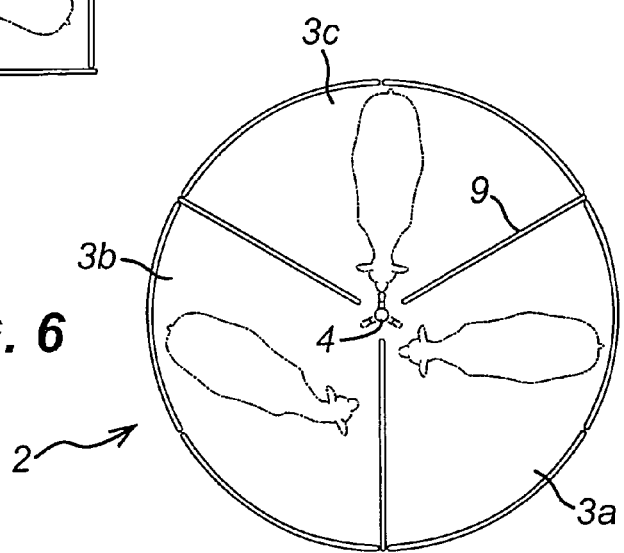

FIGS. 4, 5 and 6 illustrate schematic arrangements in which the dispenser 4 can be accessed from respectively two, three or four enclosures, each of which may accommodate one or more animals. In FIG. 4, a series of dispensers 4 are shown, each one associated with two enclosures 2a, 2b and being in communication with a control system 36. In many cases, an aisle or passage may be provided alongside a row of adjacent enclosures 2a, 2b for easy access by animals and by personnel. In FIG. 5, there are shown four barriers 9 separating four animal enclosures 5a-d adjacent to a feed dispenser 4 which is provided in a fixed relation to the respective enclosures. The feed nipple of the dispenser 4 may thereby be accessed and used by animals from each one of the enclosures 5a-d. In FIG. 6, there is shown for illustrative purposes a possible arrangement in which a single feed dispenser 4 is provided in association with three enclosures 3a-c.

From the foregoing, it can be appreciated that fewer dispensers may be needed for any given number of enclosures, including installations in which animals are kept individually. A farmer may thereby acquire a single dispenser in respect of two or more enclosures. Moreover, in use the system, according to certain embodiments will include a nipple which may be pivoted using drive means towards one enclosure during certain hours and to another enclosure during other hours. There might be hours when the nipple 6 is not accessible in any enclosure 2a, 2b, 3a-c, 5a-d and may be in a retracted position. When liquid feed is available to a particular animal, then the animal may be prepared and informed by means of an indicator 31 which can communicate to the animal or animals in the enclosure that now liquid feed (or in some cases water) is available from the nipple 6.

The invention claimed is:

1. An animal-feeding installation, comprising:
   adjacent animal enclosures arranged side-by-side next to each other, the adjacent animal enclosures configured for feeding a first animal in a first animal enclosure and feeding a second animal in an adjacent second animal enclosure; and
   a liquid feed dispenser (4) positioned stationary with respect to the animal enclosures,
   the liquid feed dispenser comprised of a nipple assembly (10) for dispensing liquid feed to the animals within the adjacent animal enclosures,
   the nipple assembly comprised of a single feeding nipple (6), a pivot (14), a feed supply (20) fixedly positioned with respect to the animal enclosures, and a bias element (16),
   an open proximal end (18) of the pivot attached to an outlet port of the feed supply,
   the feeding nipple mounted on the pivot so that the feeding nipple is pivotable back and forth between extremes of a range of pivotability with the liquid feed dispenser (4) positioned stationary with respect to the animal enclosures, thereby allowing feeding of the animals in each of the animal enclosures, wherein i) the feeding nipple being positioned in a first portion of the range of pivotability enables the first animal to feed from the feeding nipple while prohibiting the second animal from feeding from the feeding nipple, and ii) moving the feeding nipple, via the pivot, from the first portion of the range of pivotability to a second portion of the range of pivotability enables the second animal to feed from the feeding nipple while prohibiting the first animal from feeding from the feeding nipple,
   the bias element arranged to maintain the feeding nipple in a neutral position between the extremes of the range of pivotability when not feeding the animals, the neutral position being an alignment location between the first and second animal enclosures such that the feeding nipple is graspable by both the first animal and the second animal respectively to draw the feeding nipple into an orientation of the first portion of the range of pivotability for feeding the first animal and into an orientation of the second portion of the range of pivotability for feeding the second animal.

2. The installation of claim 1, wherein,
   the bias element is a spring, the spring biasing the feeding nipple into the neutral position, and
   the neutral position located at a mid-point of the range of pivotability.

3. The installation of claim 2, wherein,
   the pivot comprises a hose (30), an open proximal end (18) of the hose attached to the outlet port of the feed supply, and
   the spring is a helical spring surrounding the hose, the spring biasing the nipple to a neutral axis (28) of the nipple.

4. The installation of claim 3, wherein,
   the pivot further comprises an articulated hinge,
   the hinge comprises hinged members on each side of a pivot pin (32),
   the spring surrounds the hinged members and the pivot pin, and
   the nipple, under control of the bias element, moves substantially horizontally between each of the animal enclosures.

5. The installation of claim 1, wherein the bias element is a electrically-powered drive system, the drive system configured to pivotally move the feeding nipple.

6. The installation of claim 5, wherein said drive system comprises an electric motor and the pivot comprises a gear driven by the electric motor.

7. The installation of claim 5, wherein said nipple assembly is retractable to a position in which the feeding nipple is unavailable to all the animals in the animal enclosure.

8. The installation of claim 1, further comprising:
   a detector arrangement positioned about said feeding nipple,
   the detector arrangement configured to issue a signal indicating when the feeding nipple is pivotally deflected in a direction corresponding to a respective animal enclosure.

9. The installation of claim 8, wherein said detector arrangement includes two separate detectors (8), each detector configured to issue a signal when said feeding nipple is pivotally deflected in a respective direction corresponding to a respective animal enclosure.

10. The installation of claim 8, wherein said nipple assembly further comprises said detector arrangement.

11. The installation of claim 1, further comprising:
   an indicator system, the indicator system configured to provide a signal that liquid feed is currently available or not available in a given animal enclosure.

12. The installation of claim 11, wherein said indicator system comprises at least one indicator (32), the signal from the indicator being perceivable by one or more animals which are within the animal enclosure.

13. The installation of claim 1, wherein said feeding nipple is pivotable between the animal enclosures from the first animal enclosure into the second animal enclosure through an arc (θ) of at least 35 degrees.

14. The installation of claim 1, further comprising:
at least one barrier (9) common to and separating two adjacent ones of the animal enclosures,
wherein the liquid feed dispenser, including the feeding nipple, is fixedly positioned in relation to said enclosures and to said barrier (9) such that the feeding nipple of said liquid feed dispenser may be accessed and used by the animals from each one of said adjacent enclosures by the feeding nipple pivoting back and forth between i) one side of the barrier to feed the first animal, and ii) another side of the barrier to feed the second animal.

15. The installation of claim 1, further comprising:
at least three adjacent animal enclosures arranged side-by-side next to each other;
at least two barriers (9) each barrier being common to and separating each pair of the adjacent animal enclosures,
wherein the liquid feed dispenser is fixedly positioned in relation to said at adjacent enclosures and to said barriers (9) such that the feeding nipple of said liquid feed dispenser may be accessed and used by the animals from each one of said adjacent enclosures by the feeding nipple pivoting back and forth between i) a first position located between two of said barriers to feed the first animal, ii) a second position between another two of said barriers to feed the second animal, and iii) a third position between still another two of said barriers to feed a third animal.

16. An animal-feeding installation, comprising:
a first set of two adjacent animal enclosures arranged side-by-side next to each other; and
a first liquid feed dispenser (4) positioned stationary with respect to the first set of animal enclosures,
the first liquid feed dispenser comprised of a first nipple assembly (10) for dispensing liquid feed to animals within the first set of adjacent animal enclosures, the first set of adjacent animal enclosures configured for feeding a first animal in a first animal enclosure and feeding a second animal in an adjacent second animal enclosure,
the first nipple assembly comprised of a single first feeding nipple (6), a first pivot (14), a first feed supply (20) fixedly positioned with respect to the first set of animal enclosures, and a first bias element (16),
an open proximal end (18) of the first pivot attached to an outlet port of the first feed supply,
the first feeding nipple mounted on the first pivot so that the first feeding nipple is pivotable back and forth between extremes of a range of pivotability between the first of the animal enclosures into the second of the animal enclosures through an arc (θ), allowing feeding of the animals in the first set of animal enclosures, wherein i) the feeding nipple being positioned in a first portion of the range of pivotability enables the first animal to feed from the feeding nipple while prohibiting the second animal from feeding from the feeding nipple, and ii) moving the feeding nipple, via the pivot, from the first portion of the range of pivotability to a second portion of the range of pivotability enables the second animal to feed from the feeding nipple while prohibiting the first of the animal from feeding from the feeding nipple,
the first bias element arranged to maintain the first feeding nipple in a neutral position between the extremes of the range of pivotability, the neutral position being an alignment location between the first and second adjacent animal enclosures such that the feeding nipple is graspable by both the first animal and the second animal respectively to draw the feeding nipple into an orientation of the first portion of the range of pivotability for feeding the first animal and into an orientation of the second portion of the range of pivotability for feeding the second animal; and
a second set of two adjacent animal enclosures arranged side-by-side next to each other; and
a second liquid feed dispenser (4) positioned stationary with respect to the second set of animal enclosures,
the second liquid feed dispenser comprised of a second nipple assembly (10) for dispensing liquid feed to animals within the second set of adjacent animal enclosures,
the second nipple assembly comprised of a single second feeding nipple (6), a second pivot (14), a second feed supply (20) fixedly positioned with respect to the second set of animal enclosures, and a second bias element (16),
an open proximal end (18) of the second pivot attached to an outlet port of the second feed supply,
the second feeding nipple mounted on the second pivot so that the second feeding nipple is pivotable back and forth between extremes of a range of pivotability and allowing feeding of the animals in the second set of animal enclosures, from within a first animal enclosure of the second set of the animal enclosures into an adjacent, second animal enclosure of the second set of the animal enclosures through an arc (θ),
the second bias element arranged to maintain the second feeding nipple in a neutral position between the extremes of the range of pivotability, the neutral position being an alignment location between the first and second adjacent animal enclosures of the second set of animal enclosures such that feeding nipple is graspable by both the first animal and the second animal respectively to draw the feeding nipple into an orientation of the first portion of the range of pivotability for feeding the first animal and into an orientation of the second portion of the range of pivotability for feeding the second animal.

17. A method of feeding animals, comprising the steps of:
allowing a first animal within a first of adjacent animal enclosures arranged side-by-side next to each other to feed from a feeding nipple of a liquid feed dispenser (4) positioned stationary with respect to the animal enclosures, the liquid feed dispenser comprised of a nipple assembly (10) for dispensing liquid feed to animals within the adjacent animal enclosures, the nipple assembly comprised of the feeding nipple (6), a pivot (14), a feed supply (20) fixedly positioned with respect to the animal enclosures, and a bias element (16), an open proximal end (18) of the pivot attached to an outlet port of the feed supply, the feeding nipple mounted on the pivot so that the feeding nipple is pivotable back and forth between extremes of a range of pivotability and allowing feeding of the animals in the animal enclosures, the bias element arranged to maintain the feeding nipple in a neutral position between the extremes of the range of pivotability, the neutral position being an alignment location between the first and second adjacent animal enclosures such that the feeding nipple is graspable by both the first animal within the first adjacent animal enclosure and a second animal within a second adjacent animal enclosure respectively to draw the feeding nipple into an orientation of a first portion of the range of pivotability for feeding the first animal and into an orientation of a second portion of the range of pivotability for feeding the second animal, wherein i) the feeding nipple being positioned in the first portion of the range of pivotability enables the first animal to feed from the feeding nipple while prohibiting the second animal from feeding from the feeding nipple, and ii) moving the feeding nipple, via the pivot, from the first portion of the range of pivotability to the second portion of the range of pivotability enables the second animal to feed from the feeding nipple while prohibiting the first of the animal from feeding from the feeding nipple;

upon the first animal completing feeding, returning the feeding nipple, under action of the bias element, to the neutral position;

allowing the second animal within the second adjacent animal enclosure to feed from the feeding nipple and upon the second animal completing feeding, returning the feeding nipple, under action of the bias element, to the neutral position.

* * * * *